March 24, 1970 W. R. EVANS Re. 26,837

ELECTRICAL CONNECTING SYSTEM AND PARTS

Original Filed Aug. 16, 1963 9 Sheets-Sheet 1

ELECTRICAL CONNECTING SYSTEM AND PARTS

Original Filed Aug. 16, 1963 9 Sheets-Sheet 2

ELECTRICAL CONNECTING SYSTEM AND PARTS

Original Filed Aug. 16, 1963 9 Sheets-Sheet 3

ELECTRICAL CONNECTING SYSTEM AND PARTS

Original Filed Aug. 16, 1963 9 Sheets-Sheet 4

ELECTRICAL CONNECTING SYSTEM AND PARTS
Original Filed Aug. 16, 1963 9 Sheets-Sheet 5
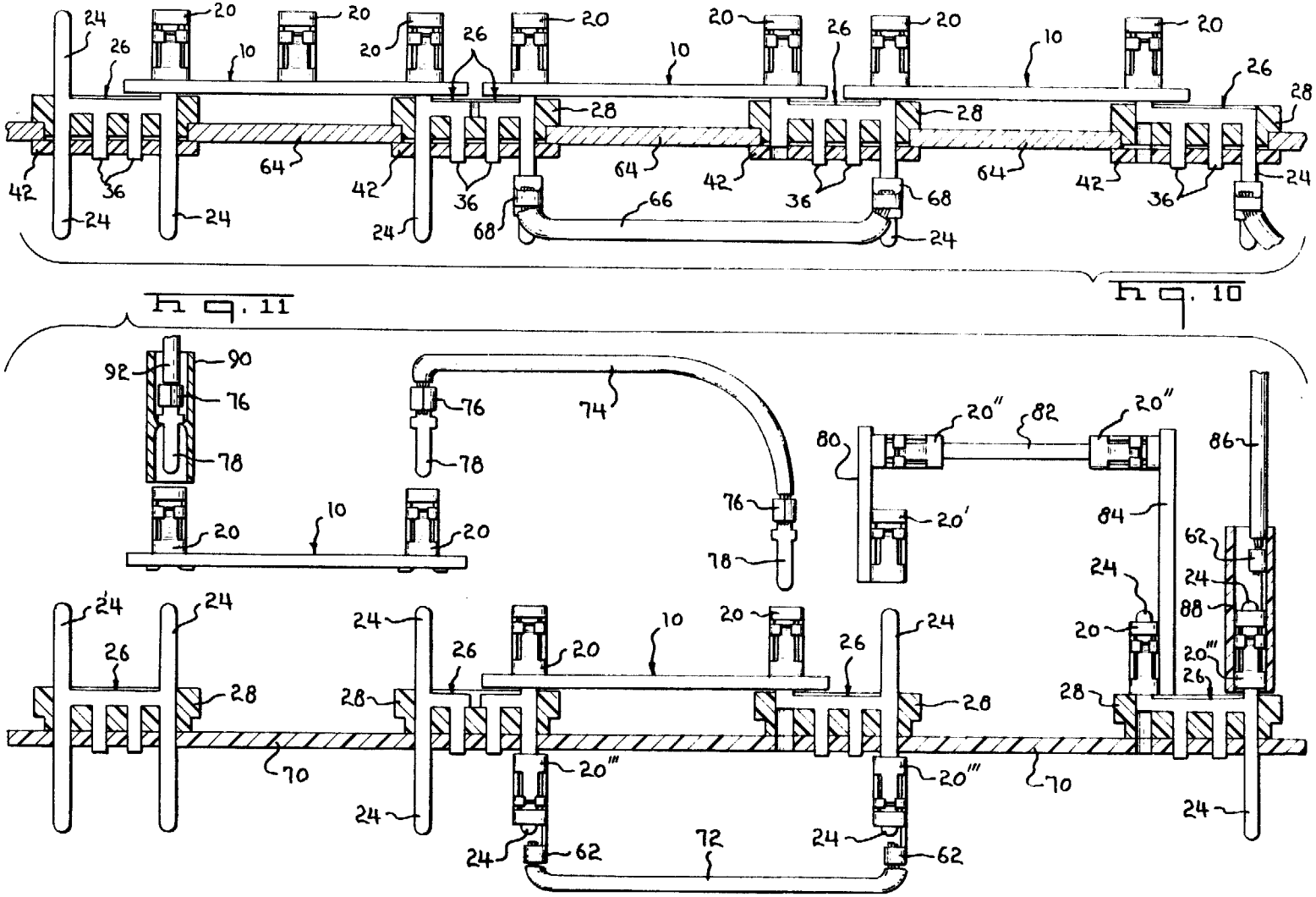

ELECTRICAL CONNECTING SYSTEM AND PARTS

Original Filed Aug. 16, 1963 9 Sheets-Sheet 6

ELECTRICAL CONNECTING SYSTEM AND PARTS

Original Filed Aug. 16, 1963 9 Sheets-Sheet 7

ELECTRICAL CONNECTING SYSTEM AND PARTS

Original Filed Aug. 16, 1963 9 Sheets-Sheet 9

ELECTRICAL CONNECTING SYSTEM AND PARTS

Original Filed Aug. 16, 1963 9 Sheets-Sheet 9

United States Patent Office

Re. 26,837
Reissued Mar. 24, 1970

26,837

ELECTRICAL CONNECTING SYSTEM AND PARTS

William Robert Evans, Hershey, Pa., assignor to AMP Incorporated, Harrisburg, Pa.

Original No. 3,270,251, dated Aug. 30, 1966, Ser. No. 302,653, Aug. 16, 1963. Application for reissue July 17, 1968, Ser. No. 747,031
Int. Cl. H02b *1/04, 9/00;* H05k *1/00*
U.S. Cl. 317—101 30 Claims

Matter enclosed in heavy brackets [ ] appears in the original patent but forms no part of this reissue specification; matter printed in italics indicates the additions made by reissue.

*ABSTRACT OF THE DISCLOSURE*

*Electrical connecting means for connecting one or more electrical modules having electrical components thereon to circuit means comprising female contacts associated with a module board and connected to the circuitry on the module board, and male contacts extending from an insulating base and insertable longitudinally through passages extending completely through the female contacts. The female contacts are of generally closed, box-like configuration having opposed spring tongues for engaging the male contacts.*

This invention relates to an electrical connecting system, and, more particularly, to an electrical connecting system by which relatively inexpensive modules may be quickly and effectively connected to conductors on primary circuit means, such as so-called mother cards or boards.

Although there are certain electrical connecting systems now available for interconnecting relatively expensive module units to primary second conductors carried by various types of supporting means, it is the principal purpose of the present invention to provide relatively inexpensive module means by which, for example, the electrical components comprising the modules may be mounted upon suitable sizes of printed circuit boards and directly connected to the conductors thereon. The invention also includes unique male and female connectors respectively employed on the modules and primary circuit means, said conductors being relatively flexible in the adaptation thereof to many different kinds of circuits, and particularly for permitting the stacking or sandwiching of a plurality of modules upon each other and being capable of quick interconnection commonly to substantial lengths of male contacts, for example, which pass successively through a series of female contacts respectively carried by the module boards.

It is another object of the invention to provide contact arrangements which may be mounted suitably either upon insulating sheet-type supporting members, such as printed circuit boards, or steel chassis, as well as the same being adapted to point-to-point wiring techniques.

A further object of the invention is to so construct especially the female contacts that they are easily and quickly connected to module members comprising printed circuit cards or boards, simply by inserting tines on the female contacts in punched holes formed in the card or board, and then clinching and soldering the projecting ends of the tines to circuit conductors on the cards or boards, said female contacts also being preferably of a rectangular cross-section and open from end to end, whereby male contact prongs or tabs may be arranged to pass through suitable openings in the printed circuit card or board and then be received within the hollow or tubular female contact to effect a circuit connection therewith.

As a corollary to the foregoing object, it is a further object to so arrange the female contacts and the tines thereon that said contacts readily either may be connected with the axes thereof perpendicular, or parallel, to the plane of the printed circuit card or board, thereby permitting the latter to be plugged and thus be connected to a primary circuit means when extending either edgewise or parallel to said primary circuit means.

Still another object of the invention is to provide unique male contacts which, essentially, are preferably substantially H-shaped and are stamped from suitable sheet metal, and the opposite ends of the sides of the male contacts may be connected to primary circuit means, such as the so-called mother-card, which may be formed either of insulating material or steel, through the employment of simple molded base members to which the male contacts are connected directly, the male contacts being programmable by selectively shearing or snipping certain prongs or tabs therefrom which are not required for a specific application and such formation of male contact permits the same to be adapted to a wide variety of interconnection of circuits on module boards or cards, for example.

A still further object of the invention is to provide connecting means on the female contacts in such manner that said contacts may be mounted on the same surface of the modular printed circuit card or board as the electrical components of the module are mounted, whereby the conductors of the module are on the opposite surface of the card or board, and the leads from the electrical components, as well as the tines for connecting the female contacts to the board, extend through suitable holes or openings in the board and thereby permit the firm connection of the projecting ends of the leads or tines to the circuit conductors on said opposite side of the board by clinching and soldering. Such connection advantageously may be made through flow solder or dip-solder techniques.

Still another object of the invention is to form especially the female contacts from a blanked strip or ribbon of resilient metal and comprising marginal strips between which contact unit blanks extend transversely and, depending upon whether the connecting tines of the contacts are to be all at one end or the other, for vertical mounting of the contact with respect to a supporting board, or both of the contacts are to extend transversely from one side thereof at opposite ends for parallel mounting of the contact relative to its supporting board, said contact unit blanks may be severed, as desired, from said blank strips selectively to provide the arrangement of tines desired on the female contact simply by bending the contact unit blanks when severed from the blanked strip into a tubular configuration, thereby minimizing cost of production of female contacts of tubular type and having at least three different possible arrangements of tines thereon for selective positioning of the contacts relative to a supporting base board.

As a corollary to the foregoing object, it is another object to form a female contact which is substantially rectangular in cross-section and open from end to end by folding the contact unit blanks into such configuration and abutting the opposite edges of the blanks into contact with each other along one side of the female contact and at least one tine, which is split, extends from such split side of the contact, whereby upon insertion of said split tine within a hole in the mounting board, separation of the abutting edges of the split tine and split side of the female contact is prevented effectively and inexpensively.

Details of the foregoing objects and of the invention, as well as other objects thereof, are set forth in the following specification and illustrated in the accompanying drawings comprising a part thereof.

Figure 3:
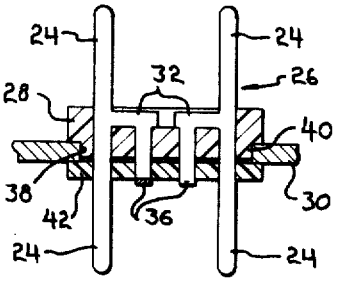
Figure 4:
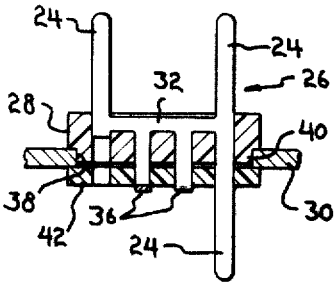
Figure 5:
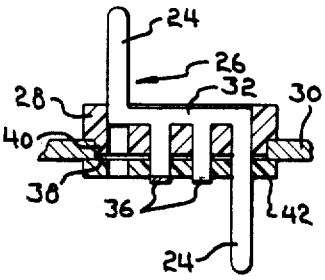

FIGS. 3, 4 and 5 respectively show different possible arrangements of unique type of male contact provided by the invention and shown supported by a suitable base or chassis means.

Figure 6:
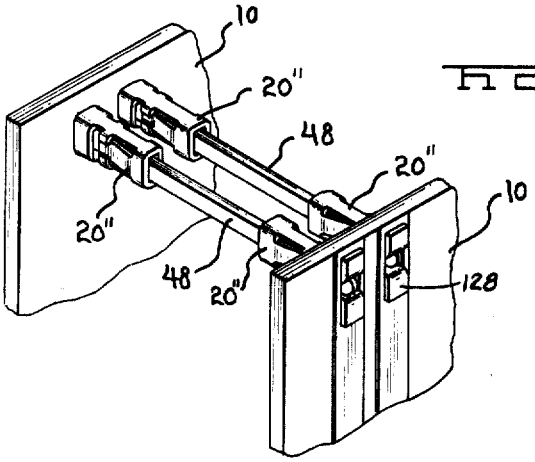

FIG. 6 is a fragmentary, perspective view of two module cards or boards connected by shorting bars.

Figure 7:
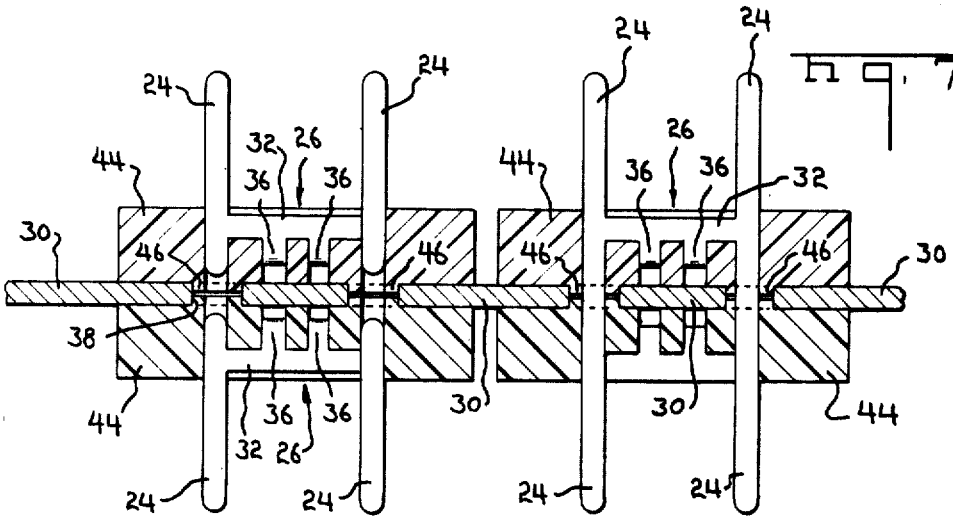

FIG. 7 is a vertical sectional view of a fragmentarily illustrated supporting plate and insulating base members supporting various arrangements of male contacts so as to project from opposite surfaces of the supporting plate member.

Figure 8:
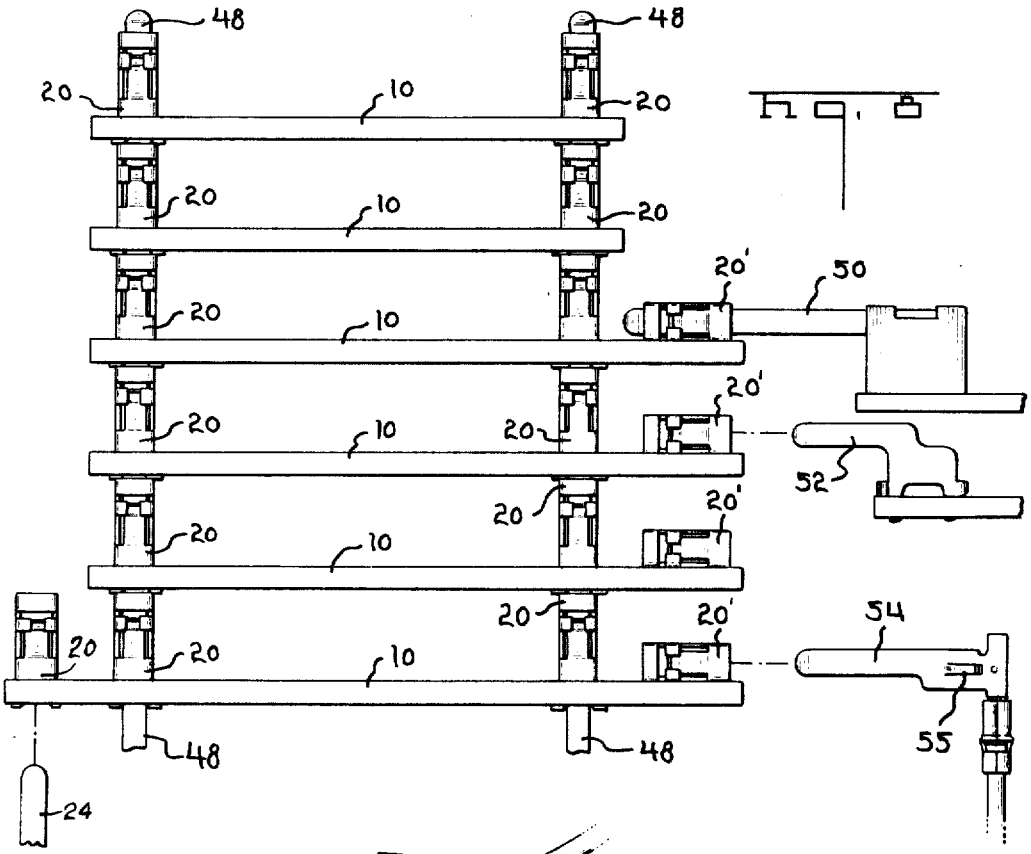

FIG. 8 is an edge view of a stacked series of module boards commonly connected to continuous male contacts or shorting bars of suitable length, which extend through a series of female contacts on the module boards, this view also illustrating fragmentary portions of additional module boards, or the like, connected edgewise to certain of the stacked module boards, some of the contacts of said additional module boards being illustrated in exploded manner with respect to the stacked module boards.

Figure 9:
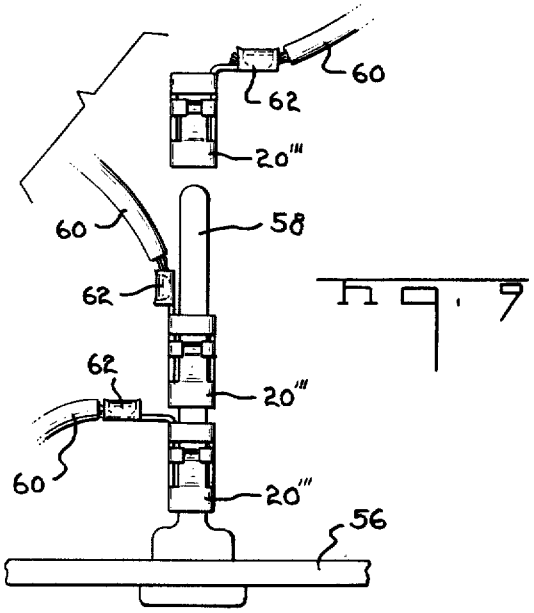

FIG. 9 is a fragmentary, vertical elevation showing a male contact or shorting bar of substantial length upon which a series of so-called flag-type female contacts are mounted, one of the latter being shown in exploded manner in position to be connected to the male contact member.

FIG. 10 is a fragmentary, vertical sectional view illustrating an arrangement of interconnected module boards mounted upon a chassis plate to which a series of male contacts and/or insulating base members are connected.

FIG. 11 is a fragmentary, vertical sectional view of still another arrangement of module boards positioned in numerous locations with respect to each other and a basic chassis plate upon which male contacts and their insulating supporting members are mounted, certain of the module boards and electrical connecting means being shown in exploded manner.

Figure 12:
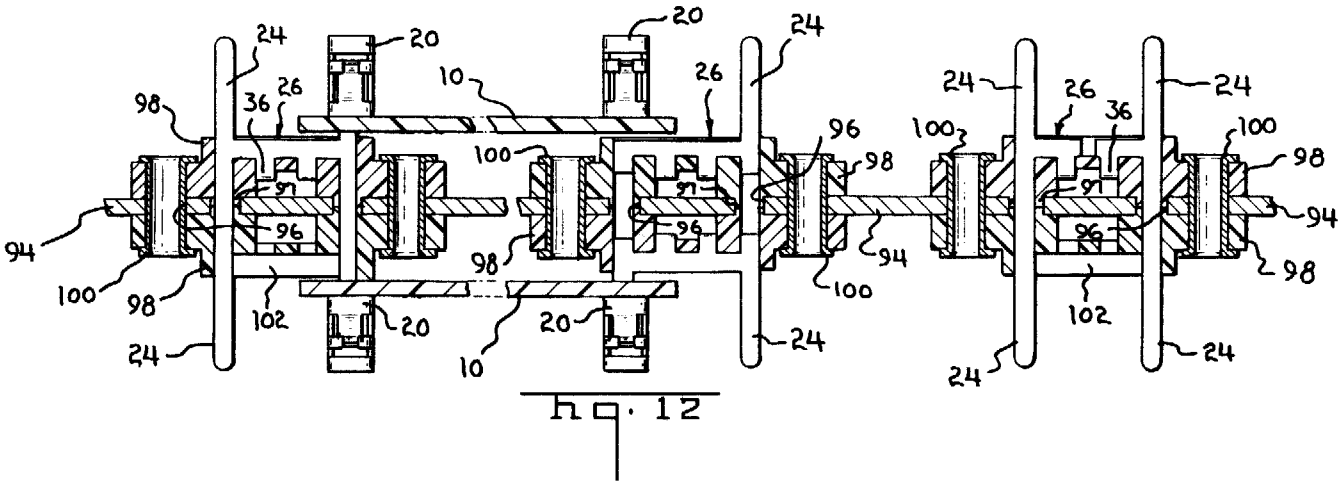

FIG. 12 is another fragmentary, vertical sectional view of a basic chassis supporting plate upon which a number of different arrangements of male contacts and their insulating base members are mounted, certain of these being connected to foreshortened, exemplary module boards, this view particularly showing certain types of connecting means for securing the insulating base members to the chassis plate formed of metal and from which the male contacts are suitably insulated.

Figure 13:
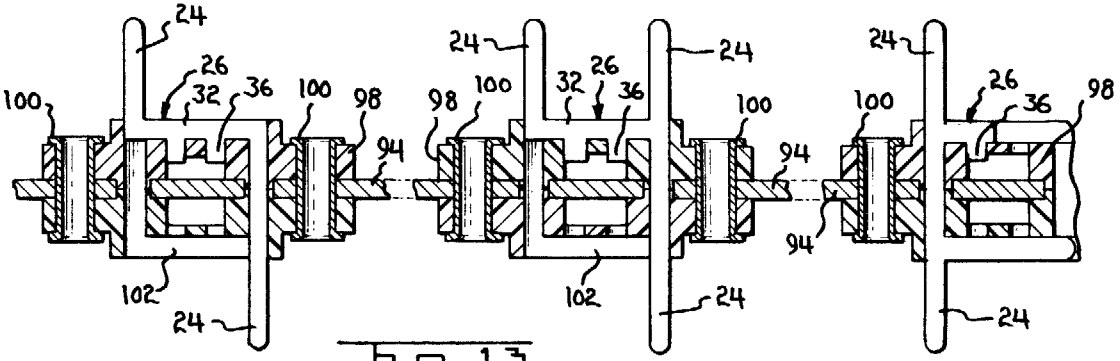

FIG. 13 is a foreshortened view illustrating a number of different arrangements and configurations of male contacts supported by their insulating base members on fragmentarily shown and foreshortened sections of chassis base plate means, the examples of male contacts being still different from those shown in the other figures.

Figure 14:
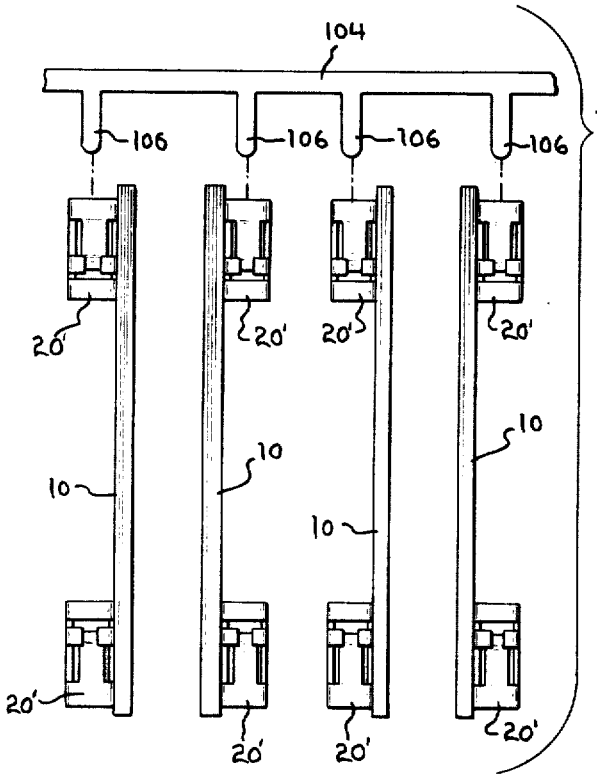

FIG. 14 is an end view showing a series of module boards having female contacts arranged thereon in parallelism to the board and a different arrangement of male contact or shorting bar, as illustrated fragmentarily in position to be inserted in the edge-mounted female contacts on the module boards.

Figure 15:
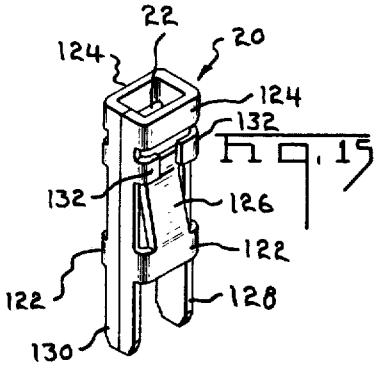
Figure 16:
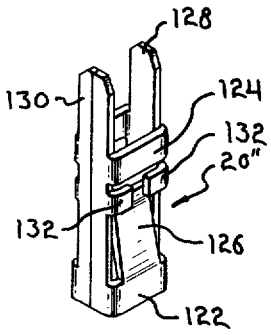
Figure 17:
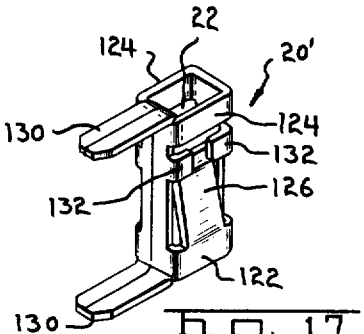

FIGS. 15 through 17 respectively are perspective views of the female contacts comprising part of the present invention, the securing tines for the contacts each being shown in different relationship with respect to the same in these different views, primarily to illustrate the substantial scope of the type of female contact construction provided by the present invention.

Figure 18:
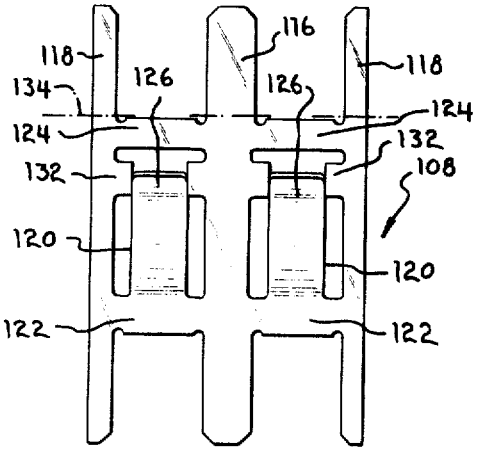
Figure 19:
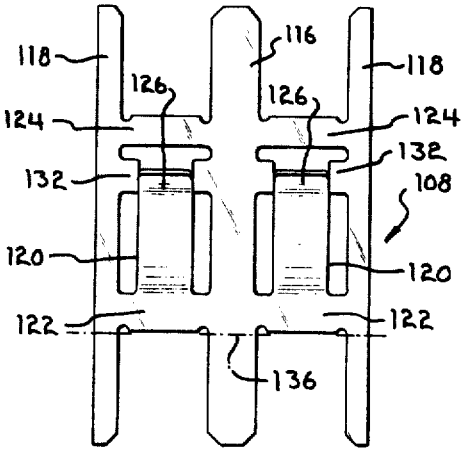
Figure 20:
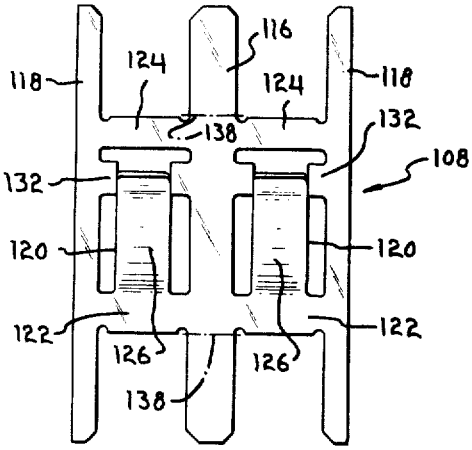

FIGS. 18 through 20 show the contact unit blanks from which the contacts of FIGS. 15 through 17 are formed, there being illustrated on each of these figures broken lines showing where portions of the blanks are severed to provide the different configurations of connecting tines illustrated on the female contacts in FIGS. 15 through 17.

Figure 21:
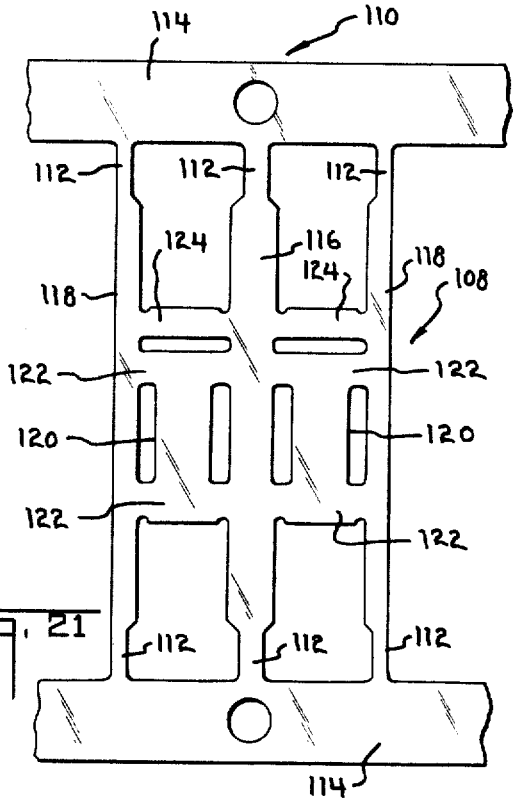

FIG. 21 is a fragmentary section of a blanked strip illustrating the manner in which the contact unit blanks of FIGS. 18 through 20 are formed initially.

Figures 22, 23:
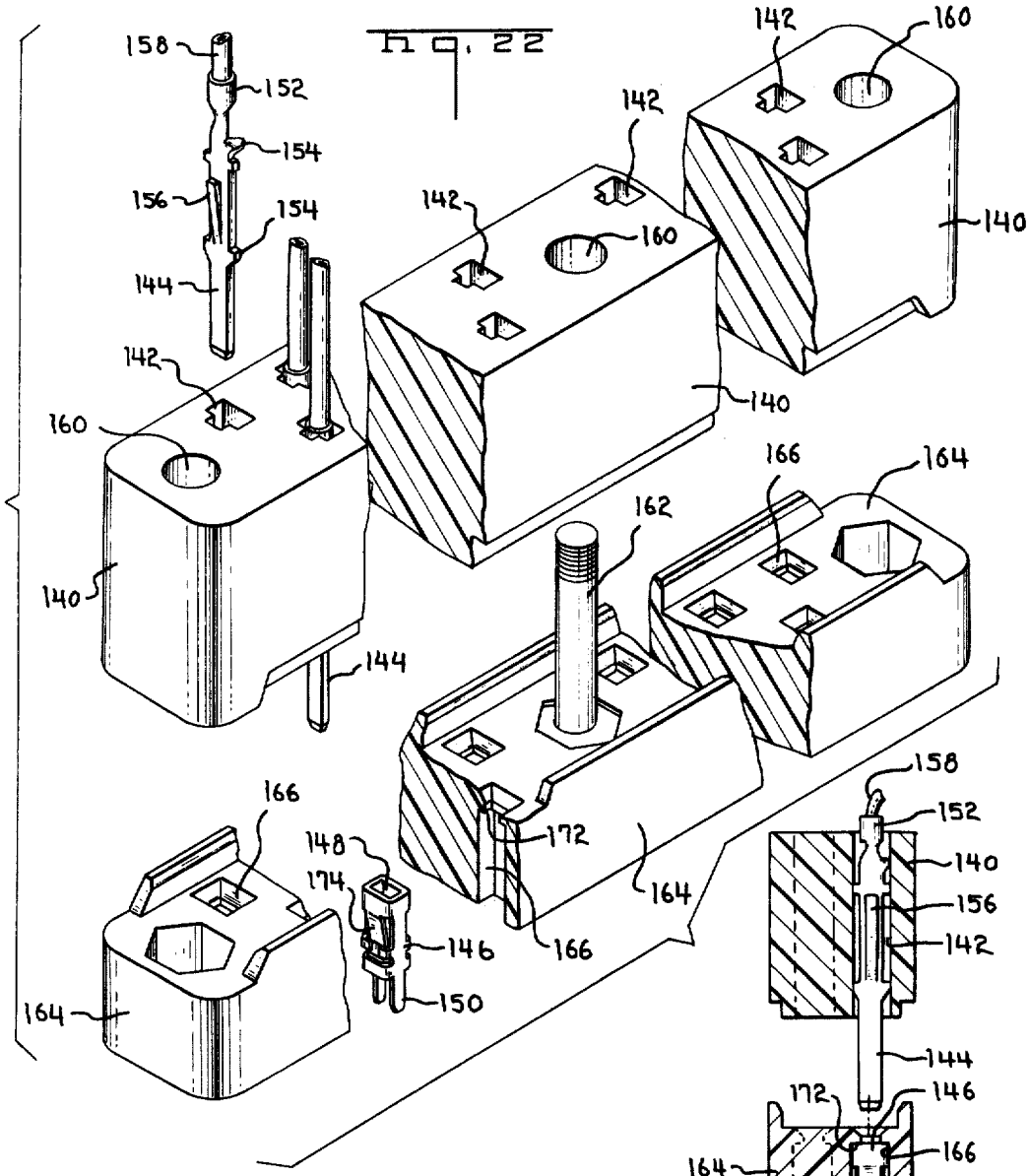

FIG. 22 is a fragmentary, exploded view of a so-called card to wire connector assembly employing the female contacts of the invention in appropriately molded housings and arranged to receive male contacts directly connected at one end to wires and the male contacts being suitably mounted within a molded housing.

FIG. 23 is a fragmentary, vertical sectional view of the embodiment of the invention shown in FIG. 22 and illustrated in exploded manner with the male contact about to be positioned within the female contact.

Figure 1:
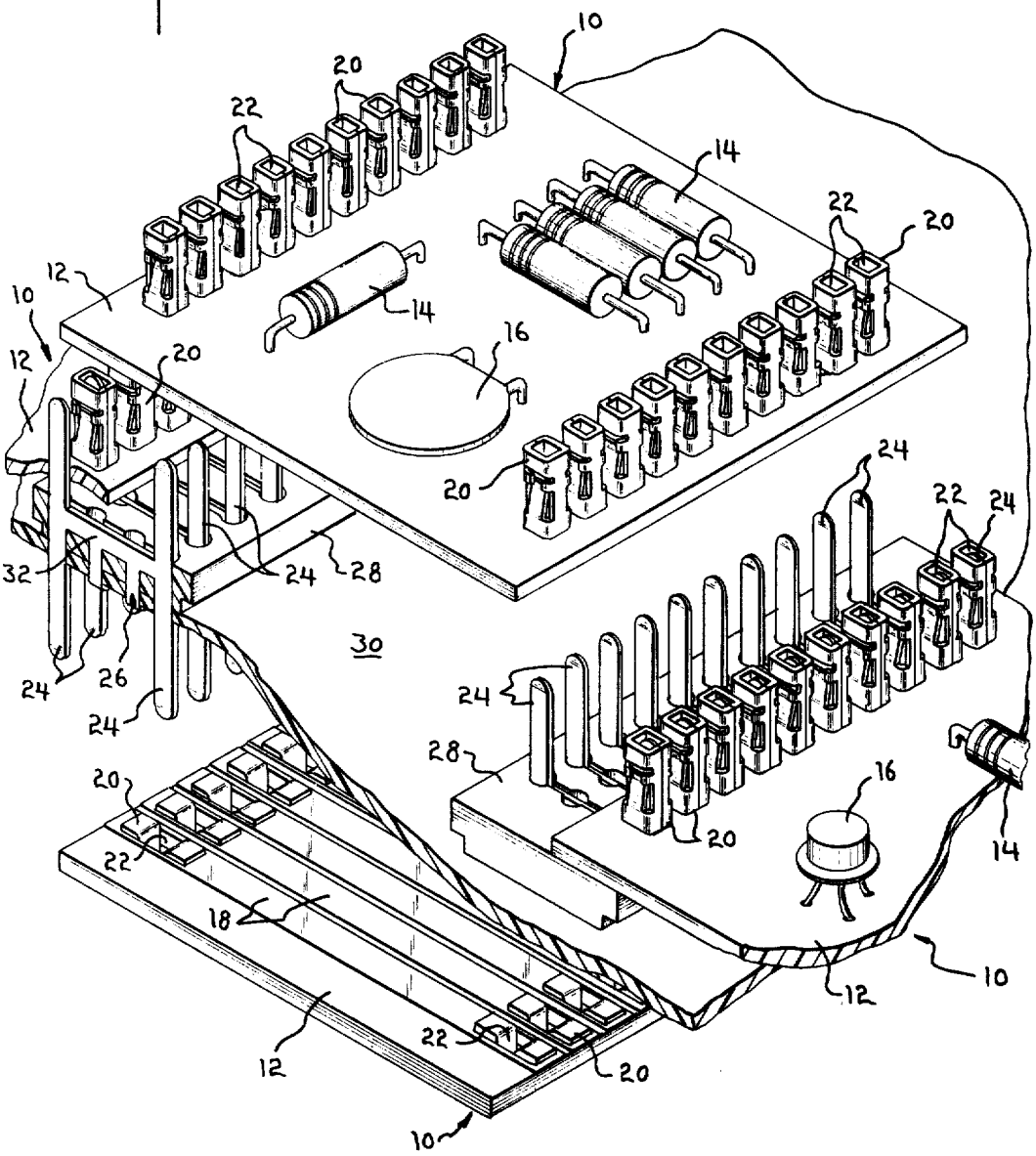
FIG. 1 is a fragmentary, exploded perspective view showing an electrical system embodying several different module assemblies connected to primary circuit means, and particularly illustrating a varied stacking arrangement permissible by the present invention, the modules being substantially parallel to each other and the primary circuit means in this view.

In FIG. 1, a module 10 is illustrated, the same comprising a suitable size of printed circuit board 12, the conductors being on the reverse surface thereof from that upon which the electrical components 14 and 16 are mounted in the module 10 shown in the upper portion of said figure. However, to illustrate the substantial latitude of the application of the present invention, there is illustrated, in the lower portion of FIG. 1, another similar module 10, which is positioned with the opposite surface of the printed circuit board uppermost and upon said opposite surface thereof will be seen flat, ribbon-type conductors 18 which are similar to or identical with the conductors on the opposite surface of the uppermost module 10a from that surface which is illustrated in FIG. 1. Still another similar module 10 is shown in fragmentary manner in the lower right-hand portion of FIG. 1.

One of the principal features of the present invention comprises the female contacts 20. Rows of these contacts are illustrated in the module 10 of FIG. 1 respectively adjacent opposite edges of the printed circuit board 12 thereof, the contacts being mounted in vertical or perpendicular position with respect to board 12. These contacts are preferably substantially rectangular in cross-section, as readily can be visualized from FIG. 1, and passages 22 extend through the female contacts from end to end for ready reception of the tabs 24 of the male contacts 26, the male contacts preferably being substantially H-shaped, as is best seen adjacent the left-hand side of FIG. 1. As will be described in greater detail hereinafter, the male contacts 26 are supported by suitable insulating base members 28, these being mounted upon a primary supporting plate 30 which, as desired or required, may be either a sheet of metal comprising part of a chassis of an appropriate electrical unit, or a sheet of insulation material, which, if desired, may have conductors mounted on one or both surfaces thereof or not.

One of the advantages of the present invention is that the male contacts 26 may be provided with tabs 24 extending in opposite directions from each other and respectively vertical to opposite surfaces of the supporting plate 30, as clearly is shown in FIG. 1. One use of such type of male contacts is to employ them as shorting or circuit-connecting members extending between, for example, female contacts on several different modules, whereby the male contacts comprise couplers or circuit-coupling means. A substantial advantage of such an arrangement is that, in accordance with the principles of the invention, the tabs 24 may project through suitable holes or openings formed in the printed circuit boards 12 in axial alignment with the passages 22 of the female contacts 20, whereby the tabs 24 extend through the boards for engagement with the female contacts by extending therethrough.

To illustrate substantial possibilities of the interconnectability of various modules in accordance with the present invention, it will be seen from FIG. 1 that, adjacent the left-hand side thereof, a series of male contacts 26 are provided on primary supporting plate 30, these having tabs 24 extending in opposite directions. The opposite sides of each of the male contacts 26 each afford a pair of tabs and the transverse bar 32 of the male contacts interconnect the opposite sides thereof. Thus, one row of tabs 24 is shown engaging the female contacts 20 of a small, fragmentary portion of a module 10 adjacent the left-hand edge of FIG. 1, while the uppermost module 10 in FIG. 1 is in position to be placed upon the opposite row of tabs 24 of the same row of male contacts. Similarly, the lowermost module 10 is in position to have the left-hand row of female contacts 20 connected to one row of male tabs 24 extending below primary supporting plate 30.

Further, the insulating base member 28 adjacent the right-hand edge of FIG. 1 is provided with two rows of upstanding tabs 24, one row of which is already connected to the female contacts 20 of the module 10 in the lower right-hand corner of FIG. 1, while the other row is in position to engage the female contacts 20 on the opposite edge of the uppermost module 10. This latter row of tabs 24 also has an oppositely extending row of tabs projecting downward therefrom, though it is not possible to illustrate the same in FIG. 1 without confusion, for reception in the passages of the female contacts 20 adjacent the right-hand edge of the lowermost module 10.

Figure 2:
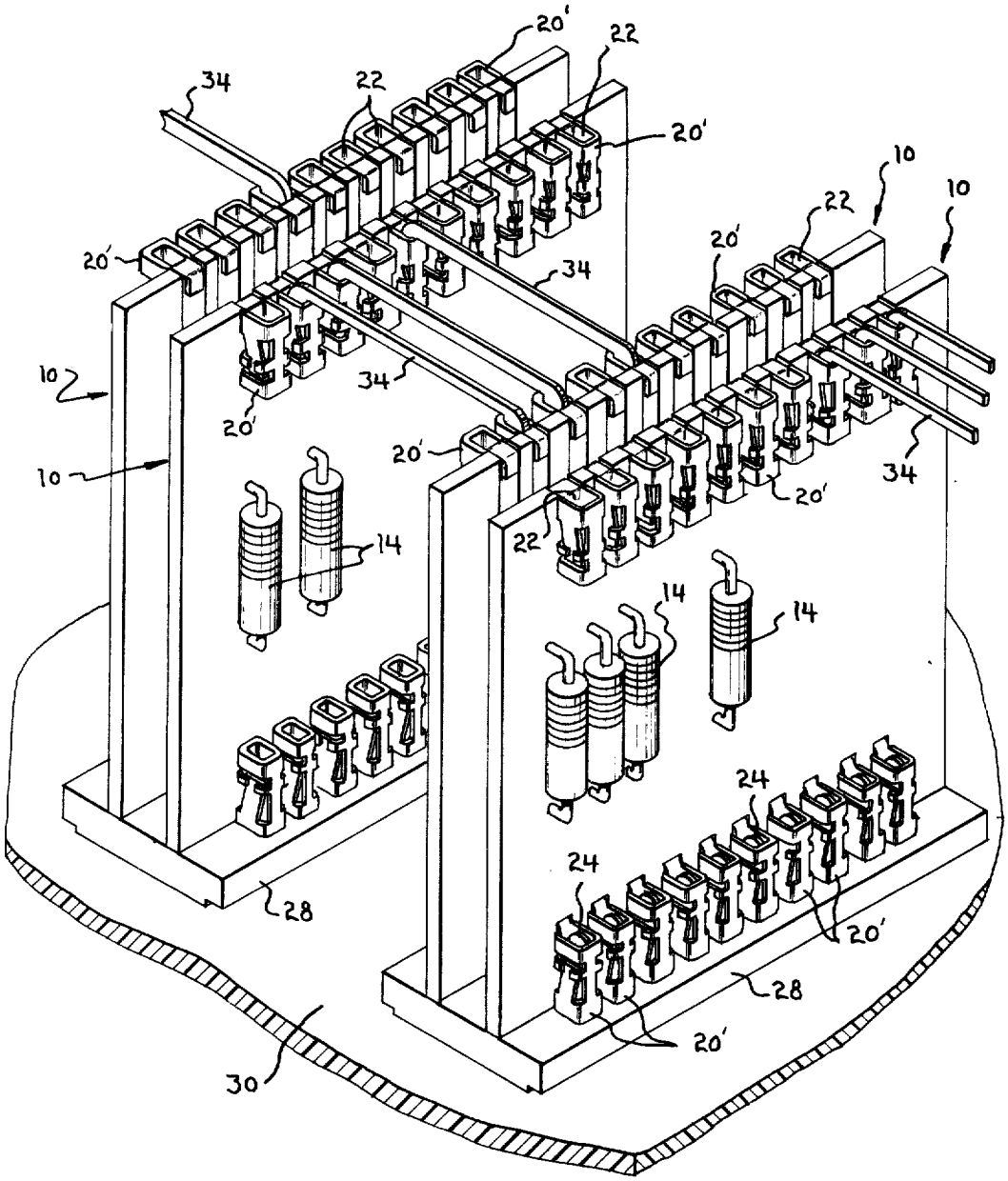
FIG. 2 is a fragmentary, perspective view illustrating a plurality of module units connected in parallel arrangement with respect to each other, but perpendicular to the primary circuit means, whereby the modules effect a so-called edge connection to the primary circuit means.

While the female contacts 20 have been illustrated with the passages 22 thereof extending substantially vertically to the plane of the printed circuit boards 12 in the arrangement shown in FIG. 1, FIG. 2 is provided to illustrate a series of modules 10 comprising printed circuit boards upon which the female contacts 20' are mounted with the passages 22 thereof substantially parallel to each other and the printed circuit boards of the module, whereby the printed circuit boards may be connected edgewise to the tabs 24 projecting upward from the insulating base members 28 mounted upon primary supporting plate 30. In addition, shorting bars 34, which may be generally U-shaped, may be arranged with the opposite ends thereof inserted into opposed pairs of female contacts 20', as clearly shown in FIG. 2, thereby affording additional selective circuit connections. Not only do the shorting bars provide desired electrical connections, but they also brace the upper edges of the vertically mounted modules.

Referring to FIGS. 3 through 5, three different arrangements of modified male contacts 26 are shown, these not being intended to be restrictive in any way, since many other possibilities can be visualized. These arrangements illustrate the wide versatility made possible through the use of an H-shaped male contact providing, for example, a maximum of four tabs 24, a transverse bar 32, which may remain intact or be severed, as shown in FIG. 3, for example, and any unneeded tabs 24 may be extended by simply snipping the same from the male contact prior to connection of the same to the insulating base member 28 which is to support the male contacts. Further to facilitate the connection of the male contacts to the base members 28, there preferably are provided several clinching lugs or tabs 36, which extend from the transverse bar 32 and by means of which not only are the male contacts secured to the base members 28, but the latter also are secured to the primary supporting plate 30 thereby, for example.

In the illustrations shown in FIGS. 3 through 5, it also is to be considered that the supporting plate 30 may be either of insulating material, or metallic. If metallic, it will be seen that the plate is provided with a suitable opening 38 extending therethrough for the reception of a suitable broad extension 40 formed on one face of the base member 28, thereby effectively positioning the base member 28 with respect to the supporting plate 30. Cooperating with the base member 28 in each of the constructions shown in FIGS. 3 through 5 is a clamping plate 42, preferably of insulating, sheet-like material, through which the clinching lugs 36 of the male contacts extend to complete the affixing and positioning of the male contacts with respect to the primary supporting plate 30. Plate 42 may, if desired, be a printed circuit board. However, this manner of securing the male contacts to such primary supporting plate is only one of a number of connecting and positioning means afforded by the present invention, details of other examples of which are described hereinafter and illustrated in succeeding figures of the drawings.

In the embodiment of male contact supporting and positioning means shown in FIG. 7, it will be seen that insulating base members 44 are shown, which are different from the base members 28 in FIGS. 3 through 5. Further, still somewhat different shapes or proportions of the same basic type of male contacts 26 are illustrated in FIG. 7, but, in the left-hand arrangement, the oppositely projecting tabs 24 are not connected to each other, although the pairs of tabs 24 projecting from the same base members 44 are connected by means of transverse bars 32. Further, the clinching lugs 36 on the male contacts are employed to affix the modified male contacts respectively to their base members 44 and, under such circumstances, the base members 44, which are mounted on opposite surfaces of the primary supporting plate 30, are connected to each other and to said plate by auxiliary connecting means, not specifically illustrated, such as bolts, hollow rivets, or otherwise.

In both the left-hand and right-hand arrangement of insulating base members 44 in FIG. 7, it will be seen that there are broad extensions 46 formed on the inner faces of the base members 44 respectively for reception within openings 38 formed in the supporting plate 30. As in regard also to the insulating base members 28 of FIGS. 3 through 5, the base members 44 of the embodiment shown in FIG. 7 are preferably formed by molding from suitable synthetic resin, or the like, and provided with appropriate recesses complementary to the male contacts for the reception thereof readily in such manner that the tabs 24 project therefrom as and where desired. By way of further example of male contact arrangement, it will be seen that the right-hand male contact 26 in FIG. 7 is provided with continuous opposed tabs 24 comprising opposite sides of the H-shaped contacts, whereby aligned pairs of said tabs extend entirely through the adjacent pairs of base members 44, as well as through the opening 38 in the supporting plate 30, the broad extensions 46 surrounding the tabs to provide ample insulation therefor, especially if the supporting plate 30 is metallic.

Connecting the arrangement shown in FIG. 6 fragmentary portions of a pair of modules 10 are shown provided with exemplary groupings of female contacts 20'' between which shorting bars 48 extend, or, if desired, said shorting bars may actually comprise the equivalent of male contact members employed for purposes of stacking a series of modules interconnected through the medium of such shorting bars 48.

A more elaborate stacking arrangement than is illustrated in FIG. 6 is shown in FIG. 8, especially to illustrate the principle made possible by the present invention that shorting bars 48 of substantially indefinite length may be employed to extend commonly through aligned series of female contacts 20 respectively mounted at any desired location on modules 10. Further, while certain of the illustrated female contacts 20 shown in FIG. 8 are disposed perpendicularly to the circuit boards of the modules, there are other female contacts 20', adjacent the right-hand side of FIG. 8, positioned with the axes thereof parallel to the boards of the modules 10, whereby various modified forms of male contact tabs 50, 52 and 54 respectively may be connected to the female contacts, the tab 50 being illustrated in engagement with its female contact, whereas tabs 52 and 54 are positioned to be inserted in selected female contacts 20'. Also, as can readily be seen from FIG. 8, the tabs 50, 52 and 54 respectively may be connected to different types of electrical means to be interconnected to the modules 10, certain exemplary showings of different electrical means respectively being connected to said tabs. Spring prong 55 struck out of tab 54 renders it suitable for disposition in a connector block for gauged mating, all as is well understood in the art.

In FIG. 9, a supporting base plate 56 is shown in fragmentary manner, the same having either a shorting or connecting bar 58 connected at one end to base plate 56. If desired, said end of the shorting bar may be connected to a suitable conductor carried by base plate 56. The principal purpose of the arrangement in FIG. 9 is to illustrate how circuit wires 60 may be interconnected together through the medium of female contacts 20'''', which have so-called flag-type terminals 62 thereon, which are crimped or clinched around ends of the wires 60, whereby a series of the female contacts 20''' may be slidably placed upon the shorting bar or elongated male contact 58 so as to interconnect all of the wires 60 together, as well as connecting the same to any circuit conductor which may be carried by base plate 56.

Still another arrangement made possible by the present invention is illustrated in FIG. 10 in which, for example, a metallic supporting plate 64 commonly supports a series of insulating base members 28 of the type shown in FIGS. 3 through 5, which are secured to supporting plates 64 by clamping plates 42 and clinching lugs 36 of the male contacts against the same. It will be seen that an exemplary number of modules 10 are connected to certain upwardly extending tabs 24 of the various male contacts, whereby the modules are interconnected to each other through the medium of said contacts, certain of the male contacts being unitary, while others are divided, all to illustrate latitude in the application of the invention to specific demands of certain circuit arrangements. Further, a jumper or shorting conduit 66 may be provided with slip-connectors 68, which slidably and frictionally engage tabs 24 of the male contacts.

A still further arrangement of interconneced modules employing male contacts of the type provided by the present invention is shown in FIG. 11. However, in this arrangement, the supporting means preferably comprises a non-metallic or insulating base plate 70 to which the insulating base members 28 may be directly connected without any special means to insulate the male contacts 26 thereof from each other, as is necessary in regard to the arrangement shown in FIG. 10 wherein a metallic base plate is employed.

The arrangement illustrated in FIG. 11 also includes various other innovations provided by the present invention, such as the use of female contacts 20''', substantially of the so-called flag-type, as shown in FIG. 9, and having clinching type terminals 62 thereon for purposes of connecting a flexible shorting conduit 72 between the tabs 24 of two different male contacts 26. Still another flexible shorting conduit 74 is shown in the upper portion of the figure with clinched type terminals 76 connected to opposite ends of the conduit 74, said terminals being affixed to male contact tabs 78, which are of suitable size to be received within selected female contacts 20 respectively carried by different modules 10, for example.

Further in FIG. 11, still another type module 80 is shown, the same having female contacts 20'' and 20' connected thereto respectively in vertical and parallel relationship to the board of said module. Said board is arranged so that said female contacts thereon may be received upon an upstanding male contact tab 24 and a horizontal shorting bar 82, the opposite end of which is connected to a female contact 20'' at the upper edge of a vertical module 84, the lower edge of which is disposed vertically with respect to the adjacent insulating base member 28 from which a tab 24 of its male contact 26 extends.

At the extreme right-hand end of FIG. 11 still a different connector means is illustrated for purposes of coupling a wire 86 to a vertical tab 24 through the medium of a female contact 20''' of the flag-type and having a clinch-type terminal 62 thereon, which engages an exposed end of the wire 86. Further, said female contact 20''' preferably is enclosed in an insulating sleeve 88 to facilitate the connection of the female contact 20''' with the male contact tab 24 under suitable insulated conditions. A similar insulating sleeve 90 is shown in the upper left-hand corner of FIG. 11 in association with a male contact 78 connected to a wire 92, the male contact 78 being receivable in a female contact 20 on the adjacent module 10.

In FIGS. 12 and 13, still further arrangements of insulating base members are shown in association with metallic supporting plates for purposes of insulating the male contacts from each other and from said metallic supporting plate. Referring specifically to the details shown in these figures, it will be seen that the metallic supporting plate 94 is provided with a plurality of rows of holes 96, or, if desired, the holes may be interconnected in the nature of a slot through which similar insulating collar extensions 97 project from the inner faces of insulating base members 98 extend so as to form insulation for the tabs 24, and especially the longitudinally connected, oppositely extending tabs on the male contacts 26. The insulating base members 98, which are disposed on opposite surfaces of the metallic supporting plate 94 are connected together and to said supporting plate by suitable means, such as hollow rivets 100. Otherwise, in general, the insulating base members 98 function similarly to the above-described insulating base members 28 with respect to supporting the male contacts 26, the latter being provided with clinching lugs 36, which engage the insulating base members 98 suitably to prevent accidental separation of the male contacts therefrom. As also will be seen in FIG. 12, exemplary modules 10 are provided with the same type of female contacts 20 for connection to the tabs 24 of the male contacts 26.

One of the principal purposes of FIGS. 12 and 13 is to show still different arrangements of modified male contacts 26 from those shown in the preceding figures. It will be observed that even contacts having only one or two tabs 24 may be arranged, as circuit requirements demand, yet the contacts effectively are supported by the insulating base members 98 so as readily to remain affixed to their supporting plates 94 incident to modules 10 being connected to and disconnected therefrom. To facilitate the understanding of certain of these illustrations, the insulating base members 98 are provided with recesses 102, which preferably snugly engage either the tabs 24 or the transverse bars 32 of the male contacts 26. However, when certain of the tabs 24 or portions of the transverse bars 32 are removed, in accordance with circuit requirements, at least portions of the recesses 102 will be unoccupied, as is shown in portions of the structure illustrated in FIGS. 12 and 13.

Further to illustrate the versatility of the present invention, there is illustrated in FIG. 14 a plurality of substantially parallel modules 10 having rows of female contacts 20' connected along opposite edges thereof, for example, all of the contacts 20' adjacent the same ends of the modules 10 being connectable by an elongated shorting bar 104 having a plurality of appropriately spaced tabs 106 extending therefrom for reception within the passages in the female contacts 20' so as to connect the circuit means on the modules 10, which are associated with the female contacts 20'.

Another important aspect of the present invention comprises the particular construction of the female contacts. A number of different embodiments of such contacts are afforded by the present invention, although all of them embrace the same basic structure, the principal differences being the arrangement of connecting tines which are provided on the different arrangements. Preferably, the contacts are formed from resilient sheet material, a blanked strip or ribbon being formed from such material for purposes of forming contact unit blanks 108. A fragmentary portion of the blanked strip 110 is shown in FIG. 21, and it will be seen that small webs 112 connect the contact unit blanks 108 with margin strips 114.

One of the principal virtues of the contact unit blanks 108 is that through the special design of said blank, any one of the different types of female contacts 20, 20' and 20'', respectively shown in FIGS. 15 through 17, may be formed therefrom, thereby minimizing expense, simplification of die structure, and a saving in material.

The unit blanks 108 each comprise three long parallel transverse portions of which the intermediate portion 116 is substantially twice as wide as the outer portions 118. The unit blanks 108 also comprise a pair of shorter transverse portions 120, which are parallel to and interposed between the longer transverse portions 116 or 118. The shorter portions 120 are interconnected adjacent the opposite ends thereof to the longer transverse portions 116 and 118 by short hinge sections 122, shown in FIG. 21, respectively adjacent opposite ends of the shorter portions 120. There also are terminal strap portions 124 extending between the outer and intermediate long transverse portions 116 and 118.

After the blanked strip 110 is formed, the short hinge sections 122 adjacent one end of the shorter portions 120 are severed by slits which are parallel to the shorter portions so as to form opposed spring contact tongues 126 extending inward from opposite side walls of the contacts, as clearly shown in FIGS. 15 through 17 when the contact unit blanks 108 are folded or bent at the short hinge sections 122 and at the opposite ends of the terminal strap portions 124 to form a tubular configuration which, preferably, is rectangular in cross-section, as clearly shown in FIGS. 15 through 17.

The opposite ends of the outer and intermediate long transverse portions 116 and 118 are provided for purposes of forming connecting or attaching tines 128 and 130. It will be seen that the tines 128 are unitary, whereas the tines 130 are split, as is the side of the contact to which the split tines 130 are connected. This split arrangement results from the abutting of the side edges of the outer longitudinal transverse portions 118 together, whereby said abutting narrower, outer transverse portions substantially equal in width the width of the intermediate solid transverse portion 116.

The contact tongues 126 preferably are connected at one end to the female contacts adjacent the entrance end of said contacts. Inasmuch as the tongues 126 extend inwardly toward each other at the unconnected ends thereof, such arrangement provides an effective guiding and centering means for the reception of the male contact tabs 24 within the longitudinal passage 22 extending from end to end within the female contacts. As it sometimes is desirable to project the male contact tabs 24 through the supporting printed circuit board of the module to which the female contacts are connected before entering the female contacts, the tines 128 and 130 are arranged to extend axially from the entrance end of the female contact, as shown in FIG. 15. However, if the male contact tabs 24, or any equivalent type of male contact, are to be inserted into the female contact from the end opposite that which is connected to the printed circuit board, for example, then the tines 128 and 130 are arranged to extend from the end of the female contact 20'' which is opposite the entrance end, as shown in FIG. 16.

It thus will be seen that the female contacts shown in FIGS. 15 and 16 are both arranged to be positioned vertically or perpendicularly with respect to the plane of the printed circuit board to which they are to be connected. However, the selection of the type of female contact respectively shown in these figures depends upon whether the male contact tab or equivalent is to be first inserted through the board before entering the female contact or not.

To connect the female contacts to a printed circuit board, the board is first provided with an appropriate hole or opening extending therethrough for the reception of the tines 128 and 130 adjacent opposite walls of the hole or opening, following which the outer ends of said tines are bent outwardly away from each other so as to clinch the same against the opposite surface of the board from which the female contacts project vertically. Usually, the conductors 18 on one surface of the circuit board likewise are apertured in axial alignment with the passage in the female contacts for purposes of having the tines 128 and 130 extend therethrough and when the same are clinched, they engage the conductors 18, as shown in the lower portion of FIG. 1, for example, and positive connection of said tines with said conductors is assured through the use of solder. Further, inasmuch as the female contacts preferably extend from the same surface of the module boards as the electrical components mounted upon said boards, as shown in FIGS. 1 and 2, it is possible to flow-solder or dip-solder all of the tines, as well as leads from the electrical components, to the conductors 18 comprising the printed circuits, for example, upon the modules 10, whereby a single dipping operation, for example, effects all connections simultaneously.

The foregoing description pertains primarily to vertically disposed female contacts 20 and 20''. Particularly where edge connection of modules to male contacts, or shorting bars for example, is desired, as in regard to the arrangement shown in FIGS. 2 and 14, the female contacts 20' must be disposed with the axis of the passage therethrough parallel to the plane of the printed circuit board. Accordingly, the arrangement shown in FIG. 17 is employed under such circumstances, wherein tines are provided which extend from opposite ends of the female contacts, and perpendicularly to the axis of the passage therethrough, both of said tines being split tines 130 because they both extend from the split side of the contact 20'.

One of the distinct advantages of this type of female contact having one split side and at least one split tine extending therefrom is that when the split tines are disposed in the openings in the supporting printed circuit board, the opposite walls of such holes or openings engage the outer edges of the split tine 130 and prevent separation thereof, as well as separation of the split side to which said split tines are connected. Another precautionary aspect of the female contact resides in the provision of ears 132, which overlie the outer surfaces of the contact tongues 126 adjacent the free ends thereof for purposes of limiting the outward flexing movement of said tongues away from each other incident to the same engaging a male contact tab, or the like. Said ears 132 are very inexpensively formed as a result of severing certain of the short hinge sections 122 incident to freeing the outer ends of the tongues 126 from the blanks to which they otherwise are connected at the opposite ends of the tongue.

The manner in which the various forms of female contacts are obtained from the contact unit blanks 108 is best illustrated in FIGS. 18 through 20, wherein it will be seen that, in FIG. 18, a broken line 134 extends transversely across the long portions 116 and 118. When the blank 108 is severed along this line, a female contact of the type shown in FIG. 15 is formed. In FIG. 19, a broken line 136 is shown and when the blank 108 is severed along said line, a female contact of the type shown in FIG. 16 results. Further, in FIG. 20, short broken lines 138 are shown only in regard to the long intermediate transverse portions of the blank and when said blank is severed on these lines, a female contact of the type shown in FIG. 17 is produced.

It thus will be seen that through the simple expedient of selecting where the outer ends of the intermediate and outer long transverse portions are severed from the contact unit blanks 108, three different specific types of female contacts, but all basically the same with the exception of the securing tines, are produced. Further, by additional particular designing of the contact unit blanks 108, the spring contact tongues 126 are provided, together with the restraining ears 132.

A still further advantage of this particular type of female contact is that the passage therethrough is open from end to end, whereby an indefinite number of such contacts may be sandwiched or stacked upon a single continuous length of male contact tab or shorting bar, without interference or difficulty, thereby permitting extremely compact arrangements of modules or other similar electrical units with which the connecting system comprising the present invention is associated. Further, particularly in regard to the embodiments of female contacts shown in FIGS. 15 and 16, the connecting tines thereof are such that said contacts may be positioned at any desired location upon a surface of a printed circuit board for a module, or otherwise, the positioning of such female contacts adjacent one edge, for example, not being required, as in regard to many conventional types of female contacts.

This invention also lends itself to being employed for the connection of wire to conductors on a printed circuit board. One embodiment of this aspect of the invention is illustrated in FIGS. 22 and 23. Referring to these figures, it will be seen that a male contact housing 140 is formed by molding from suitable synthetic resin to provide a plurality of regularly spaced sockets 142 arranged to receive male contacts 144 of complementary size to be received within the female contacts 146 comprising bodies having passages 148 extending entirely therethrough from end to end for purposes of slidably receiving and frictionally engaging the male contacts 144.

The female contacts 146 preferably are identical with the female contacts 20'' described hereinabove and illustrated in the preceding figures. The tines 150 thereon also are for a similar purpose to the tines 128 and 130 of said contacts 20.

The end of the male contacts 144 opposite that which is inserted within the female contacts 146 is formed with a clinch-type terminal 152 and various types of positioning ears 154 which limit the inward movement of the male contacts 144 with respect to the sockets 142. Further, a spring tongue 156 extends angularly outward at the free end thereof from the plane of the male contacts 144 for purposes of engaging a suitable shoulder within the sockets 142 to prevent withdrawal movement of the male contacts from the housing 140. Such arrangement provides a simple and effective means for securely anchoring the male contacts 144 within the housing 140 and, further, likewise provides a highly effective means for connecting a wire 158 to the male contacts, whereby a plurality of such wires 158 may be connected to the housing 140, depending upon the number of sockets 142 therein.

Although, in FIG. 22, the housing 140 is shown in three sections, it is to be understood that it is unitary and such illustration is merely for purposes of foreshortening the view in that such housing may be of substantial length. Further, the housing is provided with a plurality of bolt-receiving holes 160, there being one bolt 162 shown extending upward from the intermediate portion of the female contact housing 164.

The female contact housing 164, as in regard to the male contact housing 140, is illustrated in fragmentary manner in FIG. 22 to foreshorten the view thereof, and also to illustrate details of the molded sockets 166, which receive the female contacts 146. The lower surface of the female contact housing 164 is adapted to be disposed against a surface of a printed circuit board 168 that is opposite the surface thereof upon which conductors 170 are mounted. The tines 150 are clinched against the conductors 170 and preferably are soldered thereto. Adjacent the entrance end of the sockets 160, a molded shoulder 172 is formed to secure the entrance end of the female sockets 146 against upward withdrawal at the time of withdrawing the male contacts 144 when housing 140 is separated from housing 164, for example.

By virtue of the female sockets 146 having a passage 148 entirely therethrough, as well as the particular design of the socket 166 which receives such female contacts and permits axial movement entirely through the female contact, it is possible to utilize male contacts of substantial length and thereby effect secure engagement thereof by the tongues 174 provided at opposite sides of the female contacts 146, as in regard to the tongues 126 of the female contacts described hereinabove.

It also will be noted that the sockets in the male contact housing 140 and sockets 166 in the female contact housing 164, are disposed in a staggered arrangement, particularly to facilitate the connecting of the tines 150 with adjacent conductors 170 as is especially evident from FIG. 23. By such an arrangement, a compact positioning of the sockets and contacts with respect to each other for a given linear length of the housings 140 and 164 is possible.

From the foregoing, it will be seen that the present invention provides a highly effective, yet very simple arrangement of male contacts which may be plugged through a printed circuit card or board, for example, into a female contact which has a passage therethrough from end to end, whereby substantially unlimited stacking of printed circuit boards, for example, is possible if male contacts of appropriate area, a relatively low cost module system is possible, simply by mounting the electrical components of the modules directly upon the surface of the printed circuit boards opposite that surface upon which the conductors are placed. Further, by arranging the securing tines of the female conductors so as to be clinched against the conductor surface of the printed circuit board, the female contacts, as well as the leads from the various electrical components, all may be effectively secured to the conductors of the printed circuit board by dip or flow-soldering, thereby minimizing cost.

Unique constructions also are provided in both the male and female contacts. The male contact, essentially comprising a stamping formed from sheet metal in arrangements generally resembling an H-shaped, designed so that it is possible to expend certain of the prongs comprising the opposite ends of the sides of the H-shaped male contact, even only leaving one tab of the male contact projecting, if the circuit arrangements require this. By eliminating the tabs projecting from one edge of the transverse bar of the male contacts, a U-shaped male contact results. Various other configurations and arrangements obviously are possible, as illustrated in certain figures of the drawings and described in detail hereinabove.

Regarding the female contacts, at least three different arrangements are made possible from a single type of relatively inexpensive contact unit blank formed in a blanked strip. Simply by severing the contact unit blanks from the margin strips of the blanked strip, the individual contact unit blanks may be suitably arranged through selected severing, particularly to form the connecting tines either at one end or the other of the female contact, or with both tines extending laterally from the same side, but at opposite ends of the contact, thereby affording substantial latitude for the formation of a selected range of female contacts from a single pattern of contact unit blanks.

While the invention has been described and illustrated in its several preferred embodiments, it should be understood that the invention is not to be limited to the precise details herein illustrated and described since the same may be carried out in other ways falling within the scope of the invention as claimed.

What is claimed is:

1. Electrical connecting means for coupling electrical modules to circuit conductors and comprising in combination, module board units having means by which electrical elements may be connected thereto and circuit conductors attached thereto, female contacts having passages extending longitudinally therethrough, tines projecting from said contacts and extending through said board units to connect the contacts thereto, elongated insulating base members having recesses therein, male contact members comprising support portions and tabs extending therefrom, said support portion being positioned within said recesses for support thereby and said tabs projecting perpendicularly from said base members for longitudinal reception of certain of said tabs within the passages of said female contacts, and plate-like supporting means against one surface of which said base members are connected, certain other of said tabs on said male contacts extending through said base members and supporting means to secure the same together.

2. The electrical connecting means set forth in claim 1 further characterized by said male contact having tabs extending in opposite directions from said support portions of said male contact members and engaging respectively female contacts separated by said plate-like supporting means.

3. The electrical connecting means set forth in claim 2 further characterized by said plate-like supporting means comprising a sheet-like insulator board and the outer ends of certain tabs of said male contacts which extend through said board being clinched against said board to secure the same to said insulating base members which support said male tabs.

4. The electrical connecting means set forth in claim 2 further characterized by said plate-like supporting means comprising a metal shielding plate and said insulating base members being mounted on opposite surfaces of said shielding plate in alignment with each other, said plate having an opening to receive tabs therethrough extending between said base members on said opposite surfaces of said shielding plate and said tabs being spaced from the walls of said opening in said plate, and said electrical connecting means also including means to secure said insulating base members against said opposite surfaces of said shielding plate.

5. The electrical connecting means set forth in claim 4 further including insulating extensions on at least one of said insulating base members projecting into the opening in said metal shielding plate and at least partially surrounding said male contact tabs to insure insulation thereof from said metal shielding plate.

6. The electrical connecting means set forth in claim 4 further characterized by the faces of said insulating base means positioned against said shielding plate being similar and each having insulating extensions thereon extending toward each other and provided with axially aligned openings through which said tabs of said male contacts extend to insure insulation thereof from said shielding plate.

7. The electrical connecting means set forth in claim 4 further characterized by said securing means being independent of said male contacts and extending through said insulating base members and shielding plate to connect the same as a unit for the coupling of module board units to the opposite surfaces of said shielding plate for reception of the male contacts projecting from said opposite surfaces of said plate within the female contacts connected to said module board units either perpendicularly or parallel thereto.

8. Electrical connecting means for connecting one or more electrical modules having electrical components thereon to circuit means and comprising in combination, a module circuit board having electrical conductors fixed to one surface thereof for connection to electrical components to be connected to another surface and supported by said module board, female contacts supported by said module board and having a socket passage extending longitudinally therethrough, said female contacts being disposed externally of said module board on the same surface of said module board as said electrical components, a plurality of tines extending from each said female contact and extending through openings in said module board for connection to said conductors thereon, opposed spring-like tongues on opposite sides of said contacts having contact surfaces thereon urged toward each other, ears extending from said female contacts and overlying said tongues adjacent the outer ends thereof to limit the outward deflection of said tongues, circuit means to which said module board is detachably connected, said circuit means including male contact tabs insertable longitudinally through the passages of said female contacts and frictionally engaged by said tongues thereof for electrical engagement therewith, said tabs being fixed to an insulating base member and extending perpendicularly therefrom.

9. The electrical connecting means set forth in claim 8 further characterized by a pair of said tines extending parallel to each other and the longitudinal axis from opposite sides of the same end of said contact, said tines extending through an opening means in said module board from one surface and clinched against the opposite surface thereof to hold said contact perpendicular to said board.

10. The electrical connecting means set forth in claim 8 further characterized by said female contacts being formed from resilient sheet metal bent into a tube that is rectangular in cross-section to form said socket passage and one wall thereof including abutting ends of said sheet metal, and said spring-like tongues being formed in opposed side walls not including said abutting ends.

11. The electrical connecting means set forth in claim 8 further characterized by said tines on the female contact projecting respectively from the opposite ends thereof and extending transversely to the axis thereof, said tines extending through openings in the module board to hold one wall of said female contact against said board with the axis of said passage parallel thereto and the outer end of at least one tine being clinched against the circuit means on said module board and fixed thereto for firm electrical connection therewith.

12. The electrical connecting means set forth in claim 8 further characterized by said female contacts being formed from resilient sheet metal bent into a tube that is substantially rectangular in cross-section to form said socket passage, one wall of said contact being split and comprising abutting edges of said bent sheet from which said contact is formed, and at least one end of said split wall having a tine formed thereon, whereby said tine is split and the positioning of said split tine in said opening in said module circuit board serving to prevent any appreciable spreading of said tine and split wall of said female socket.

13. A female contact having a longitudinal passage extending completely therethrough and open from end to end for the reception of a male contact therethrough, said female contact comprising a generally rectangular strap portion disposed at each of opposite ends of said passage, a pair of side walls extending between said strap portions and integral with each said strap portion, said side walls defining opposite sides of said longitudinal passage, a pair of spring tongues integral with one said strap portion and extending generally longitudinally from opposite sides thereof, said spring tongues and said side walls cooperating to form a generally enclosed passage between said strap portions, said spring tongues being bent inwardly to approach each other adjacent the free ends thereof, anti-overstress means overlying the free ends of said tongues for limiting the outward movement of said tongues upon insertion of a male contact therebetween, and means extending from at least one of said strap portions for connecting said female contact to an electrical conductor.

14. A female contact as set forth in claim 13 wherein said last named means comprises a pair of tines extending from opposite sides of the same end of said contact whereby said contact may be mounted perpendicularly to a board member, said tines being electrically connected to electrical conductors on said board member.

15. A female contact as set forth in claim 13 wherein said last named means comprises a pair of tines extending from opposite ends of the same side of said contact whereby said contact may be mounted parallel to a board member, said tines being electrically connected to electrical conductors on said board member.

16. A female contact as set forth in claim 13 wherein said last named means comprises a ferrule member extending from one end of said contact and adapted to be crimped to an electrical conductor.

*17. Electrical connecting means for connecting one or more electrical modules having electrical components thereon to circuit means and comprising in combination, a module circuit board having electrical conductors fixed to one surface thereof for connection to electrical components to be connected to another surface and supported by said module board, female contacts disposed on said module board and having a socket passage extending longitudinally therethrough, said female contacts being disposed externally of said module board on the same side of said module board as said electrical components, tine means extending from each said female contact and extending through openings in said module board for connection to said conductors thereon, circuit means to which module board is detachably connected, said circuit means including male contact tabs insertable longitudinally through the passages of said female contacts for electrical engagement therewith, said tabs being fixed to an insulating base member and extending perpendicularly therefrom.*

*18. Electrical connecting means for connecting one or more electrical modules as set forth in claim 17 further said openings in said module board are in alignment with said socket passages of said female contacts and wherein said male contact tabs are insertable through said openings in said module board.*

*19. Electrical connecting means for connecting one or more electrical modules as set forth in claim 17 further comprising an insulating housing disposed on said module board and containing said female contacts.*

*20. A female contact having a longitudinal passage extending completely therethrough and open from end to end for the reception of a male contact therethrough, said female contact comprising a generally rectangular strap portion disposed at each of opposite ends of said passage, a pair of side walls extending between said strap portions and integral with each said strap portion, said side walls defining opposite sides of said longitudinal passage, a pair of spring tongues integral with one said strap portion and extending generally longitudinally from opposite sides thereof, said spring tongues and said side walls cooperating to form a generally enclosed passage between said strap portions, said spring tongues being bent inwardly to approach each other adjacent the free ends thereof, and means extending from said female contact for connecting said female contact to an electrical conductor.*

*21. A female contact as set forth in claim 20 wherein said last named means extends from at least one of said strap portions.*

*22. A female contact as set forth in claim 20 further comprising means for limiting the outward movement of said tongues upon insertion of a male contact therebetween.*

*23. A female contact as set forth in claim 22 wherein said limiting means is associated with the free ends of said tongues for preventing the overstressing of said tongues.*

*24. A female contact as set forth in claim 20 wherein said last named means comprises tine means extending from one end of said female contact and adapted to be passed through an aperture in a board member.*

*25. A female contact as set forth in claim 20 wherein said last named means comprises a ferrule member extending from one end of said contact and adapted to be crimped to an electrical conductor.*

*26. Electrical connecting means for connecting one or more electrical modules having electrical components thereon to circuit means and comprising in combination, a module circuit board having electrical conductors fixed to one surface thereof for connecting to electrical components to be connected to another surface and supported by said module board, a plurality of female contacts regularly spaced along said module board, each said female contact having a socket passage extending longitudinally therethrough, said female contacts being disposed externally of said module board on the same side of said module board as said electrical components, tine means extending from each said female contact and extending through said module board for connection to said conductors thereon, and circuit means to which said module board is detachably connected, said circuit means comprising a plurality of male contact tabs insertable longitudinally through said passages in said female contacts for electrical engagement therewith, an insulating base member supporting said tabs in regularly spaced relation, supporting means for supporting said insulating base member, and means for securing said base member to said supporting means.*

*27. Electrical connecting means as set forth in claim 26 further comprising openings in said module board in alignment with said socket passages of said female contacts for receiving said male contact tabs therethrough.*

*28. Electrical connecting means as set forth in claim 26 wherein each said female contact further comprises spring-like tongues having contact surfaces thereon for frictionally engaging said male contact tabs.*

*29. Electrical connecting means for coupling electrical modules to circuit conductors and comprising in combination, module board units having means by which electrical elements may be connected thereto and circuit conductors attached thereto, female contacts having passages extending longitudinally therethrough, tines projecting from said contacts and extending through said board units to connect the contacts thereto, elongated insulating base members having recesses therein, male contact members being positioned within said recesses and projecting perpendicularly from said base members for longitudinal reception within the passages of said female contacts, plate-like supporting means against which said base members are connected, and means associated with said base members for securing said base members to said supporting means.*

*30. Electrical connecting means as set forth in claim 29 further characterized by said male contact members extending in opposite directions from said base members*

*and engaging respectively female contacts separated by said plate-like supporting means.*

References Cited

The following references, cited by the Examiner, are of record in the patented file of this patent or the original patent.

UNITED STATES PATENTS

| | | | |
|---|---|---|---|
| 2,166,879 | 7/1939 | Wagstaff | 339—258 |
| 2,540,037 | 1/1951 | Vough et al. | 339—258 |
| 2,778,097 | 1/1957 | Berg | 29—193.5 |
| 2,869,090 | 1/1959 | Johanson | 339—17 |
| 2,871,551 | 2/1959 | Harris | 29—193.5 |
| 2,913,634 | 11/1959 | Scoville | 317—101 |
| 2,936,407 | 5/1960 | Ewald | 339—17 X |
| 2,967,285 | 1/1961 | Freitas | 339—18 |
| 2,992,403 | 7/1961 | Hawk | 339—17 X |

| | | | |
|---|---|---|---|
| 3,001,106 | 9/1961 | Higgs | 339—17 X |
| 3,054,078 | 9/1962 | Baschkin | 339—18 |
| 3,060,402 | 10/1962 | Olsson et al. | 339—258 X |
| 3,097,032 | 7/1963 | Hochheiser | 339—17 |
| 3,149,893 | 9/1964 | Dupre | 339—1 X |
| 3,157,733 | 11/1964 | De Masi | 339—17 X |

FOREIGN PATENTS

| | | |
|---|---|---|
| 611,497 | 10/1948 | Great Britain. |
| 657,838 | 9/1951 | Great Britain. |

ROBERT K. SCHAEFER, Primary Examiner

J. R. SCOTT, Assistant Examiner

U.S. Cl. X.R.

339—017

PO-1050
(5/69)

UNITED STATES PATENT OFFICE
CERTIFICATE OF CORRECTION

Patent No. Reissue 26837 Dated March 24, 1970

Inventor(~~s~~) William Robert Evans

It is certified that error appears in the above-identified patent and that said Letters Patent are hereby corrected as shown below:

Column 15, line 46, after "means to which" insert - - - said - - -

Column 15, line 53, delete "further" and insert - - - wherein - - -

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents

AMP 2884